(12) United States Patent
Song et al.

(10) Patent No.: US 12,278,358 B2
(45) Date of Patent: Apr. 15, 2025

(54) ELECTRODE SLURRY COATING METHOD AND APPARATUS COMPRISING PRESSURE ADJUSTMENT MEMBER

(71) Applicant: LG Energy Solution, Ltd., Seoul (KR)

(72) Inventors: Hyeon Min Song, Daejeon (KR); Duk Hyun Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 842 days.

(21) Appl. No.: 17/425,060

(22) PCT Filed: Nov. 9, 2020

(86) PCT No.: PCT/KR2020/015568
§ 371 (c)(1),
(2) Date: Jul. 22, 2021

(87) PCT Pub. No.: WO2021/096169
PCT Pub. Date: May 20, 2021

(65) Prior Publication Data
US 2022/0102694 A1    Mar. 31, 2022

(30) Foreign Application Priority Data

Nov. 11, 2019 (KR) .......................... 10-2019-0143427

(51) Int. Cl.
*H01M 4/04* (2006.01)
*B05C 5/02* (2006.01)
*B05C 11/10* (2006.01)
*H01M 4/88* (2006.01)
*H01M 10/052* (2010.01)

(52) U.S. Cl.
CPC ....... *H01M 4/0404* (2013.01); *H01M 4/8828* (2013.01); *H01M 10/052* (2013.01)

(58) Field of Classification Search
USPC ................................ 118/410, 692, 683, 684
See application file for complete search history.

(56) References Cited

U.S. PATENT DOCUMENTS

| 5,989,622 A | 11/1999 | Iwashita et al. |
|---|---|---|
| 2008/0102196 A1 | 5/2008 | Morishima et al. |
| 2012/0097096 A1 | 4/2012 | Yang |
| 2012/0263879 A1 | 10/2012 | Wilsey et al. |

(Continued)

FOREIGN PATENT DOCUMENTS

| CN | 101850320 A | * 10/2010 | ......... H01L 21/6715 |
|---|---|---|---|
| CN | 102728515 A | 10/2012 | |
| CN | 202823766 U | 3/2013 | |

(Continued)

OTHER PUBLICATIONS

English Translation KR101744041B1 (Year: 2017).*

(Continued)

*Primary Examiner* — Yewebdar T Tadesse
(74) *Attorney, Agent, or Firm* — Lerner David LLP (57) ABSTRACT

The present technology relates to an electrode slurry coating method and apparatus comprising a pressure adjustment member for adjusting the discharge pressure of slurry, and enables electrode slurry to be discharged under constant pressure even when a coated part and an uncoated part are repeatedly formed on a current collector layer.

9 Claims, 5 Drawing Sheets

(56) References Cited

U.S. PATENT DOCUMENTS

| | | |
|---|---|---|
| 2017/0309887 A1 | 10/2017 | Hirai et al. |
| 2018/0337393 A1 | 11/2018 | Jeong et al. |

FOREIGN PATENT DOCUMENTS

| | | | |
|---|---|---|---|
| CN | 107078271 A | | 8/2017 |
| CN | 108352497 A | | 7/2018 |
| JP | H06190845 A | | 7/1994 |
| JP | H09108605 A | | 4/1997 |
| JP | 2001340796 A | | 12/2001 |
| JP | 2002028553 A | | 1/2002 |
| JP | 2002143755 A | | 5/2002 |
| JP | 2005144376 A | | 6/2005 |
| JP | 2006043505 A | | 2/2006 |
| JP | 2013004400 A | * | 1/2013 |
| JP | 2013022527 A | | 2/2013 |
| JP | 2013198843 A | | 10/2013 |
| JP | 2014057937 A | | 4/2014 |
| JP | 2015097198 A | | 5/2015 |
| JP | 2016033884 A | | 3/2016 |
| JP | 2016175003 A | | 10/2016 |
| JP | 2017047393 A | | 3/2017 |
| KR | 200340149 Y1 | | 1/2004 |
| KR | 100709229 B1 | | 4/2007 |
| KR | 20080039286 A | | 5/2008 |
| KR | 20130012050 A | | 1/2013 |
| KR | 20130133869 A | | 12/2013 |
| KR | 101523671 B1 | | 5/2015 |
| KR | 101641095 B1 | | 7/2016 |
| KR | 101744041 B1 | | 6/2017 |
| KR | 20170101025 A | | 9/2017 |
| KR | 101853680 B1 | | 5/2018 |
| KR | 20190037805 A | * | 4/2019 |
| WO | 2009075155 A1 | | 6/2009 |

OTHER PUBLICATIONS

English Translation JP2017054762 (Year: 2017).*
English Translation KR20190037805 (Year: 2019).*
English Translation CN-101850320A (Year: 2010).*
English Translation JP-2013004400A (Year: 2013).*
International Search Report for Application No. PCT/KR2020/015568 mailed Feb. 24, 2021, pp. 1-2.
Extended European Search Report including Written Opinion for Application No. 20887906.4, dated Apr. 14, 2022, pp. 1-8.
Search Report dated Jul. 22, 2022 from Office Action for Chinese Application No. 202080022536.7 issued Jul. 27, 2022. 3 pgs.

* cited by examiner

ELECTRODE SLURRY COATING METHOD AND APPARATUS COMPRISING PRESSURE ADJUSTMENT MEMBER

CROSS-REFERENCE TO RELATED APPLICATIONS

The present application is a national phase entry under 35 U.S.C. § 371 of International Application No. PCT/KR2020/015568, filed on Nov. 9, 2020, which claims priority to Korean Patent Application No. 10-2019-0143427, filed on Nov. 11, 2019, the disclosures of which are incorporated herein by reference in their entirety.

TECHNICAL FIELD

The present invention relates to an apparatus and method for coating an electrode slurry including a pressure regulating member.

BACKGROUND ART

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

In addition, the secondary battery has a structure in which an electrode assembly including a positive electrode, a negative electrode, and a separator interposed between the positive electrode and the negative electrode is accommodated in a battery case in a state impregnated with an electrolyte solution. The positive electrode and the negative electrode are coated with an electrode slurry containing an active material on a current collector formed of, for example, a metal foil, such as aluminum or copper.

Figure 1:
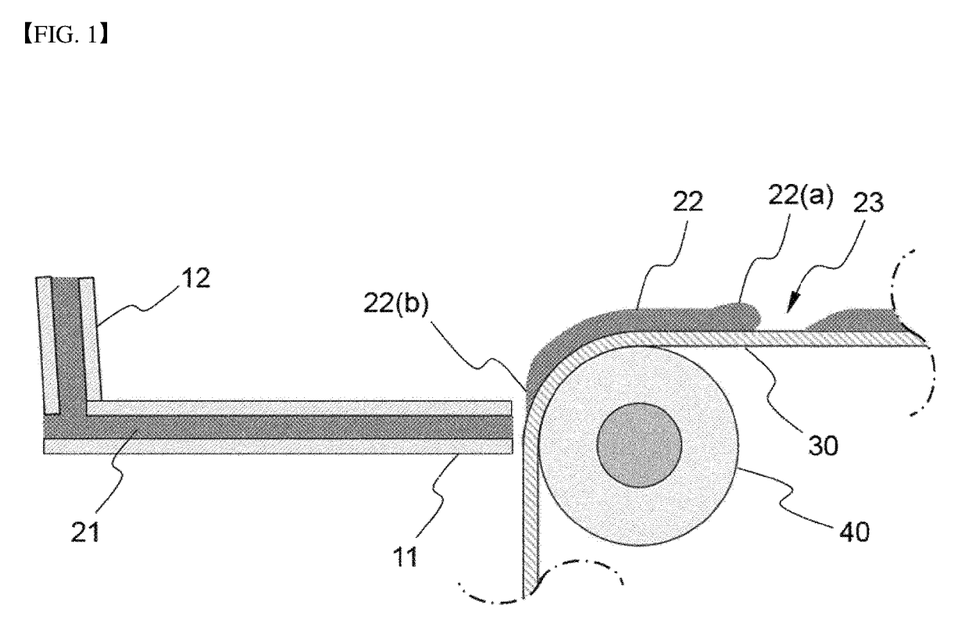
FIG. 1 is a schematic diagram showing a process of discharging an electrode slurry on a current collector layer using a conventional electrode slurry coating apparatus.

FIG. 1 is a schematic diagram showing a process of discharging an electrode slurry on a current collector layer using a conventional electrode slurry coating apparatus. Referring to FIG. 1, the electrode slurry coating apparatus has a structure in which an electrode slurry discharge flow path 11 for discharging an electrode slurry 21 through a slit formed on an interface between two dies is formed. In addition, the slurry supply flow path 12 is fluidly connected to the slurry discharge flow path 11, through which the electrode slurry 21 is supplied. A current collector 30 formed of a metal foil passes the front of the electrode slurry discharge flow path 11 through a conveyor (not shown) driven by a rotating roller 40. The discharged electrode slurry is discharged on the current collector layer 30. The structure shown in FIG. 1 is a structure in which a coated part 22 and a non-coated part 23 are repeated on the current collector layer 30. The coated part 22 is a region where the electrode slurry is coated, and the non-coated part 23 is a region where the electrode slurry is not coated. The electrode slurry coating apparatus repeats the discharge and interruption of the electrode slurry 21. However, when the discharge of the interrupted electrode slurry is resumed, excessive load is taken into the electrode slurry discharge flow path 11, and excessive electrode slurry is discharged. As a result, in the case of the front 22(a) of the coated part 22, the coating becomes thick as the excess electrode slurry is discharged, and in the case of the rear 22(b) of the coated part 22, the coating rapidly becomes thin as the discharge of the electrode slurry is interrupted. As such, when a conventional electrode slurry discharge apparatus is used, it is difficult to uniformly perform the electrode coating of a structure in which the coated part 22 and the non-coated part 23 are repeated.

DISCLOSURE

Technical Problem

The present invention was invented to solve the above problems, and an object of the present invention is to provide an electrode slurry coating apparatus and method including a pressure regulating member.

Technical Solution

The present invention provides an apparatus for coating an electrode slurry. In one example, an apparatus for coating an electrode slurry according to the present invention includes:

an electrode slurry discharge flow path configured to discharge an electrode slurry through a slit formed on an interface between first and second dies; an electrode slurry storage tank configured to be fluidly connectable to the electrode slurry discharge flow path and store the electrode slurry therein at a static pressure condition; and a static pressure opening and closing valve configured to be located on a flow path on which the electrode slurry discharge flow path is fluidly connected to the electrode slurry storage tank, wherein an opening or closing of the static pressure opening and closing valve is determined according to a difference between a pressure of the electrode slurry discharge flow path and an internal pressure of the electrode slurry storage tank.

In a specific example, the electrode slurry discharge flow path and the electrode slurry storage tank face each other in a state in which the static pressure opening and closing valve is interposed therebetween.

In one example, the static pressure opening and closing valve is opened when the pressure of the electrode slurry discharge flow path is greater than the internal pressure of the electrode slurry storage tank.

In a specific example, the static pressure opening and closing valve includes a shielding member supported by an elastic force of an elastic body, and the shielding member is opened if force of pressurizing the shielding member by the pressure of the electrode slurry discharge flow path exceeds a predetermined reference value.

In another specific example, the apparatus further includes a sensor configured to measure an internal pressure of the electrode slurry discharge flow path, and the static pressure opening and closing valve is opened if a pressure measured by the pressure sensor exceeds a predetermined reference value.

In one example, the electrode slurry storage tank further includes an electrode slurry outlet flow path configured to discharge the stored electrode slurry if the internal pressure of the electrode slurry storage tank exceeds a predetermined reference value.

In a specific example, the electrode slurry outlet flow path is fluidly connected to the electrode slurry discharge flow path.

In one example, the electrode slurry discharged through the electrode slurry discharge flow path is discharged on a current collector layer which is moved by a conveyor.

In another example, the electrode slurry coating apparatus further includes a discharge control pump configured to control a discharge amount of the electrode slurry through a discharge flow path of the electrode slurry.

In one example, the electrode slurry coating apparatus further includes a discharge blocking member configured to control an opening and closing of the discharge flow path of the electrode slurry.

In a specific example, the discharge blocking member is formed at an end of the discharge flow path of the electrode slurry.

Further, the present invention provides a method for coating an electrode slurry by using the above described electrode slurry coating apparatus. In one example, a method for coating an electrode slurry according to the present invention includes a step of discharging an electrode slurry on a current collector layer through a slit-shaped electrode slurry discharge flow path formed on an interface between first and second dies, wherein in the step of discharging the electrode slurry, a process of starting a discharge of the electrode slurry and a process of interrupting the discharge of the electrode slurry are repeated at regular intervals, and wherein a pressure of the electrode slurry discharged by a pressure regulating member formed on the slit-shaped discharge flow path is maintained at a static pressure.

In one example, the pressure regulating member includes: an electrode slurry storage tank configured to be fluidly connectable to the electrode slurry discharge flow path and store the electrode slurry therein at a static pressure condition; and a static pressure opening and closing valve configured to be located on a flow path on which the electrode slurry discharge flow path is fluidly connected to the electrode slurry storage tank, wherein an opening or closing of the static pressure opening and closing valve is determined according to a difference between a pressure of the electrode slurry discharge flow path and an internal pressure of the electrode slurry storage tank.

In a specific example, the static pressure opening and closing valve is opened when the pressure of the electrode slurry discharge flow path is greater than the internal pressure of the electrode slurry storage tank.

Advantageous Effects

The electrode slurry coating apparatus and the method according to the present invention include a pressure regulating member, so that the electrode slurry can be discharged at a constant pressure even when the coated part and the non-coated part are repeated on the current collector layer.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention relates to an apparatus for coating an electrode slurry, and in one example, the apparatus includes:

an electrode slurry discharge flow path configured to discharge an electrode slurry through a slit formed on an interface between first and second dies;
an electrode slurry storage tank configured to be fluidly connectable to the electrode slurry discharge flow path and store the electrode slurry therein at a static pressure condition; and
a static pressure opening and closing valve configured to be located on a flow path on which the electrode slurry discharge flow path is fluidly connected to the electrode slurry storage tank, wherein an opening or closing of the static pressure opening and closing valve is determined according to a difference between a pressure of the electrode slurry discharge flow path and an internal pressure of the electrode slurry storage tank.

The electrode slurry discharge flow path has a slit-shaped structure and refers to a flow path through which the electrode slurry is discharged through the interface between the blocks in a structure in which two or more blocks are engaged.

The electrode slurry coating apparatus allows the electrode slurry to be continuously coated on the current collector which moves in one direction. When coating the electrode slurry on a current collector layer using the electrode slurry coating apparatus, the discharge can be performed in a form in which a coated part and a non-coated part are repeated in a machine direction (MD). In this case, the electrode slurry coating apparatus should repeat the discharge of the electrode slurry and interruption of the discharge. However, when the coating of the electrode slurry interrupted in the electrode slurry coating apparatus is resumed, excessive load is taken to the electrode slurry discharge flow path. When an excessive load is applied to the electrode slurry discharge flow path, the electrode slurry is excessively discharged to the coating start portion of the coated part. The excessively discharged electrode slurry causes a phenomenon that the loading amount of the electrode slurry becomes uneven, which leads to the defect of products. In the present invention, by including a pressure retaining member for maintaining a pressure of the electrode slurry discharge flow path constant, these problems are solved. The pressure retaining member has a structure including an electrode slurry storage tank and a static pressure opening and closing valve described above.

In one example, the electrode slurry discharge flow path and the electrode slurry storage tank face each other in a state in which the static pressure opening and closing valve is interposed therebetween. The electrode slurry storage tank according to the present invention is directly connected to an electrode slurry discharge flow path in a state in which a static pressure opening and closing valve is interposed. If a fluid connection line of a predetermined distance or more is formed, there is a limit in that it is difficult to immediately respond to the pressure change of the electrode slurry discharge flow path. Therefore, in the present invention, the static pressure opening and closing valve becomes part of the structure in which the electrode slurry discharge flow path is formed. Thus, in the present invention, it is possible to perform immediate pressure control by reflecting the pressure difference between the electrode slurry discharge flow path and the electrode slurry storage tank.

In one embodiment, the static pressure opening and closing valve has an open structure when the pressure of the electrode slurry discharge flow path is greater than the electrode slurry storage tank internal pressure. When the coating of the electrode slurry interrupted in the electrode slurry coating apparatus is resumed, excessive load is taken to the electrode slurry discharge flow path, thereby discharging a lot of electrode slurry. In the present invention, excessive loads in the electrode slurry discharge flow path can be efficiently resolved. That is, if an excessive load is applied to the electrode slurry discharge flow path, the static pressure opening and closing valve is opened, and a part of the electrode slurry which exists in the electrode slurry discharge flow path is leaked toward the electrode slurry storage tank. This solves the load taken to the electrode slurry discharge flow path.

In a specific example, the static pressure opening and closing valve includes a shielding member supported by an elastic force of an elastic body, and the shielding member is opened if force of pressurizing the shielding member by the pressure of the electrode slurry discharge flow path exceeds a predetermined reference value. In this case, the static pressure opening and closing valve includes a shielding member supported by a spring or a hinge structure with a spring. Thus, the present invention can control the opening and closing of the static pressure opening and closing valve in a non-powered manner and does not require a sensor for measuring the internal pressure of the electrode slurry discharge flow path.

In another specific embodiment, the electrode slurry coating apparatus according to the present invention further includes a sensor for measuring the internal pressure of the electrode slurry discharge flow path, and when the pressure measured by the pressure sensor exceeds a predetermined reference value, the static pressure opening and closing valve is opened. In this case, a pressure sensor for measuring the pressure of the electrode slurry discharge flow path is formed, thereby controlling the operation of the static pressure opening and closing valve.

In one specific example, the electrode slurry storage tank further includes an electrode slurry outlet flow path configured to discharge the stored electrode slurry if the internal pressure of the electrode slurry storage tank exceeds a predetermined reference value. The electrode slurry storage tank inside the electrode slurry has a predetermined structure, which maintains an internal pressure of, for example, a 14 kgf level. When the pressure of the electrode slurry flow path exceeds 14 kgf, the static pressure opening and closing valve is opened. As the static pressure opening and closing valve is opened, a part of the electrode slurry located in the electrode slurry discharge flow path is moved to the electrode slurry storage tank. Thus, the pressure of the electrode slurry discharge flow path is reduced. However, the internal pressure of the electrode slurry storage tank increases due to the inflowing electrode slurry. In order to solve this, the slurry storage tank may have a structure in which an electrode slurry outlet flow path is formed on the lower one side. The above-described static pressure opening and closing valve may be further formed on the electrode slurry outlet flow path.

For example, a pressure sensor for measuring the internal pressure may be formed in a slurry storage tank, and if the pressure measured in the pressure sensor exceeds the reference value, the electrode slurry outlet flow path may be opened. Alternatively, an opening and closing value of a structure including a shielding member supported by elastic force of an elastic body is located on the electrode slurry outlet flow path. The opening and closing valve with such an elastic body is advantageous in that a controller for opening and closing a separate sensor and valve is not required.

In one embodiment, the electrode slurry outlet flow path is fluidly connected to the electrode slurry discharge flow path. It is also possible to discard the electrode slurry discharged in the slurry storage tank. However, it is possible to reuse the discharged electrode slurry by allowing the electrode slurry outlet flow path to be fluidly connected to the electrode slurry discharge flow path.

In one example, the electrode slurry discharged through the electrode slurry discharge flow path is discharged on a current collector layer which is moved by a conveyor. The current layer may be formed of an aluminum foil or a copper foil. For example, the current collector layer moves along the conveyor in one direction, and the electrode slurry coating apparatus discharges the electrode slurry so that the coated part and the non-coated part are repeated on the current collector layer.

In one specific embodiment, the electrode slurry coating apparatus further includes a discharge control pump for controlling the discharge amount of the electrode slurry through the discharge flow path. The discharge control pump repeatedly performs a process of pressurization to discharge the electrode slurry and a process of interrupting the pressurization. Thus, the electrode slurry coating apparatus according to the present invention discharges the electrode slurry so that the coated part and the non-coated part are repeated on the current collector layer.

In another specific embodiment, the electrode slurry coating apparatus further includes a discharge blocking member for controlling opening and closing of the discharge flow path of the electrode slurry. The discharge blocking member is formed in the form of a bar that blocks, for example, a slit of the electrode slurry discharge flow path. When the discharge blocking member closes the electrode slurry discharge flow path, the discharge of the electrode slurry by the electrode slurry coating apparatus is discontinued. Thus, the electrode slurry coating apparatus according to the present invention discharges the electrode slurry so that the coated part and the non-coated part are repeated on the current collector layer. For example, the discharge blocking member is formed at an end of the discharge flow path of the electrode slurry.

The present invention also provides an electrode slurry coating method using the electrode slurry coating apparatus described above. In one example, a method for coating an electrode slurry according to the present invention includes a step of discharging an electrode slurry on a current collector layer through a slit-shaped electrode slurry discharge flow path formed on an interface between first and second dies.

In the step of discharging the electrode slurry, a process of starting a discharge of the electrode slurry and a process of interrupting the discharge of the electrode slurry are repeated at regular intervals, and a pressure of the electrode slurry discharged by a pressure regulating member formed on the slit-shaped discharge flow path is maintained at a static pressure.

In the present invention, by repeating a step of starting the discharge of the electrode slurry and a step of interrupting the discharge of the electrode slurry, it is possible to coat the electrode slurry on the current collector layer, with a pattern in which the coated part and the non-coated part are repeated in MD direction. In this case, the electrode slurry coating method according to the present invention should repeat the discharge of the electrode slurry and interruption of the discharge. However, when the coating the electrode slurry, if the discharge of the electrode slurry is resumed, excessive load is taken to the electrode slurry discharge flow path. The excessive load taken to the electrode slurry discharge flow path causes the electrode slurry to be excessively discharged to the coating start portion of the coated part. In the present invention, by including a pressure retaining member for maintaining a pressure of the electrode slurry discharge flow path constant, these problems are solved.

In one example, the pressure regulating member includes: an electrode slurry storage tank configured to be fluidly connectable to the electrode slurry discharge flow path and store the electrode slurry therein at a static pressure condition; and a static pressure opening and closing valve configured to be located on a flow path on which the electrode slurry discharge flow path is fluidly connected to the electrode slurry storage tank, wherein an opening or closing of the static pressure opening and closing valve is determined according to a difference between a pressure of the electrode slurry discharge flow path and an internal pressure of the electrode slurry storage tank.

In one specific embodiment, the static pressure opening and closing valve has an open structure when the pressure of the electrode slurry discharge flow path is greater than the electrode slurry storage tank internal pressure. When the coating of the electrode slurry interrupted in the electrode slurry coating method is resumed, excessive load is taken to the electrode slurry discharge flow path, thereby discharging a lot of electrode slurry. In the present invention, excessive loads in the electrode slurry discharge flow path can be efficiently resolved. That is, if an excessive load is applied to the electrode slurry discharge flow path, the static pressure opening and closing valve is opened, and a part of the electrode slurry which exists in the electrode slurry discharge flow path is leaked toward the electrode slurry storage tank. This solves the load taken to the electrode slurry discharge flow path.

In a specific example, the static pressure opening and closing valve includes a shielding member supported by an elastic force of an elastic body, and the shielding member is opened if force of pressurizing the shielding member by the pressure of the electrode slurry discharge flow path exceeds a predetermined reference value. If the static pressure opening and closing valve includes a shielding member supported by elastic force of an elastic body, the static pressure opening and closing valve includes a shielding member supported by a spring or a hinge structure with a spring. As such, the present invention can control the opening and closing of the static pressure opening and closing valve in a non-powered manner and does not require a sensor for measuring the internal pressure of the electrode slurry discharge flow path.

In another specific embodiment, the electrode slurry coating method according to the present invention further includes a sensor for measuring the internal pressure of the electrode slurry discharge flow path, and when the pressure measured by the pressure sensor exceeds a predetermined reference value, the static pressure opening and closing valve is opened.

In one example, the electrode slurry storage tank further includes an electrode slurry outlet flow path configured to discharge the stored electrode slurry if the internal pressure of the electrode slurry storage tank exceeds a predetermined reference value. Further, the electrode slurry outlet flow path is fluidly connected to the electrode slurry discharge flow path. It is also possible to discard the electrode slurry discharged in the slurry storage tank. However, it is possible to reuse the discharged electrode slurry by allowing the electrode slurry outlet flow path to be fluidly connected to the electrode slurry discharge flow path.

In the present invention, a description of the electrode slurry coating apparatus mentioned above is also applicable to the electrode slurry coating method, and a redundant description about this is omitted here.

Hereinafter, the present invention will be described in more detail through drawings and examples.

First Embodiment

Figure 2:
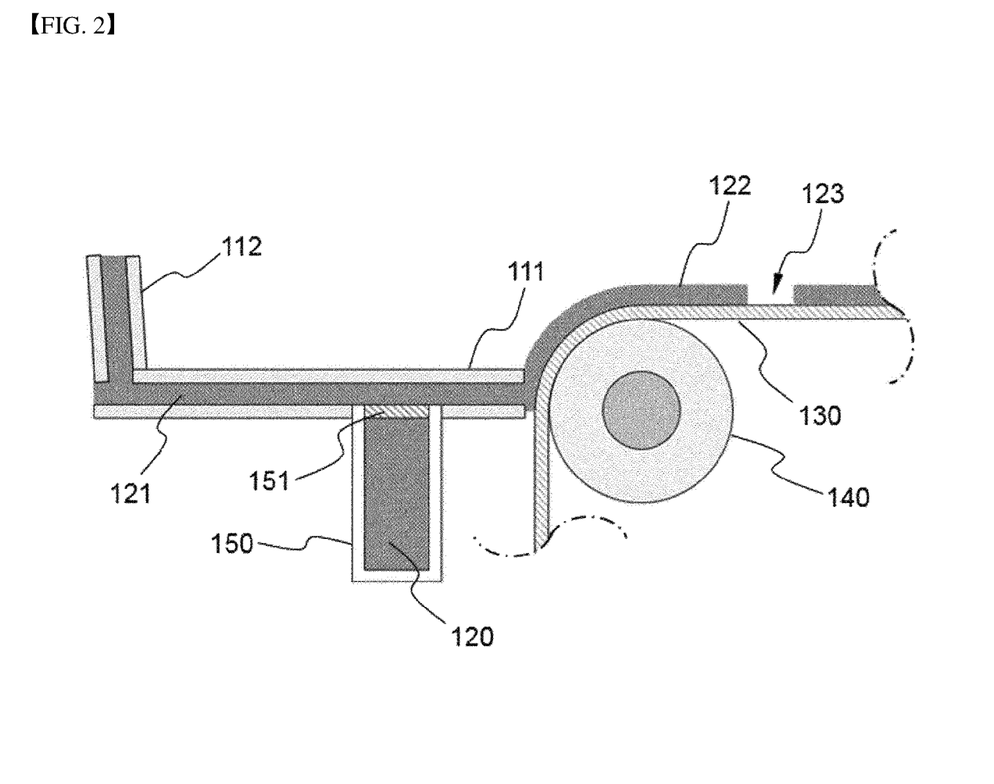
FIG. 2 is a schematic diagram showing a process of discharging an electrode slurry on a current collector layer using an electrode slurry coating apparatus according to an embodiment of the present invention.

FIG. 2 is a schematic diagram showing a process of discharging an electrode slurry on a current collector layer using an electrode slurry coating apparatus according to an embodiment of the present invention. Referring to FIG. 2, the electrode slurry coating apparatus has a structure in which an electrode slurry discharge flow path 111 for discharging an electrode slurry 121 through a slit formed on an interface between two dies is formed. In addition, the slurry supply flow path 112 is fluidly connected to the slurry discharge flow path 111, through which the electrode slurry 121 is supplied. A current collector 130 formed of a metal foil passes the front of the electrode slurry discharge flow path 111 through a conveyor (not shown) driven by a rotating roller 140. The discharged electrode slurry is discharged on the current collector layer 130. FIG. 2 shows a structure in which a coated part 122 and a non-coated part 123 are repeated on the current collector layer 130, and the electrode active material coating apparatus repeats the discharge of the electrode slurry and interruption of the discharge. However, when the discharge of the interrupted electrode slurry is resumed, excessive load is taken into the electrode slurry discharge flow path 111, and excessive electrode slurry may be discharged.

The present invention provides a pressure regulating member for maintaining the load or pressure applied to the electrode slurry discharge flow path 111 constant. The pressure regulating member includes an electrode slurry storage tank 150 where the electrode slurry 120 is filled and which maintain the internal pressure at a static pressure condition, and a static pressure opening and closing valve 141 where whether the static pressure opening and closing valve 141 is opened is determined by a difference between the pressure of the electrode slurry discharge flow path 111 and the internal pressure of the electrode slurry storage tank 150. The electrode slurry storage tank 150 can be fluidly connected to the electrode slurry discharge flow path 111 and stores the electrode slurry 120 at a static pressure condition. Further, the static pressure opening and closing valve 151 is located on the flow path where the electrode slurry discharge flow path 111 is fluidly connected to the electrode slurry storage tank 150, and whether the static pressure opening and closing valve 151 is opened is determined by the difference between the pressure of the electrode slurry discharge flow path 111 and the internal pressure of the electrode slurry storage tank 150.

Specifically, the electrode slurry discharge flow path 111 and the electrode slurry storage tank 150 face each other in a state in which the static pressure opening and closing valve 151 is interposed therebetween. Further, the static pressure opening and closing valve 151 is opened when the pressure of the electrode slurry discharge flow path 111 is greater than the internal pressure of the electrode slurry storage tank 150.

Second Embodiment

Figure 3:
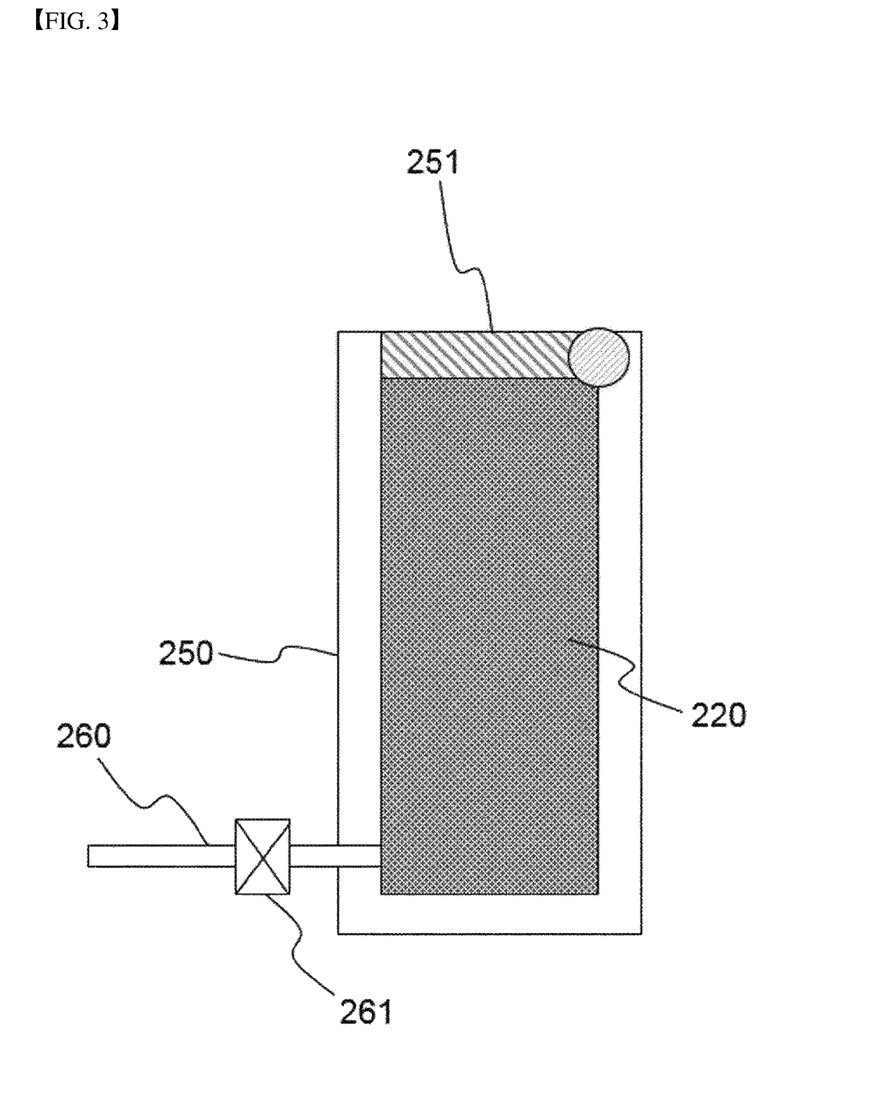
FIGS. 3 and 4 are schematic diagrams illustrating an opening and closing process of a pressure regulating member according to one embodiment of the present invention.
Figure 4:
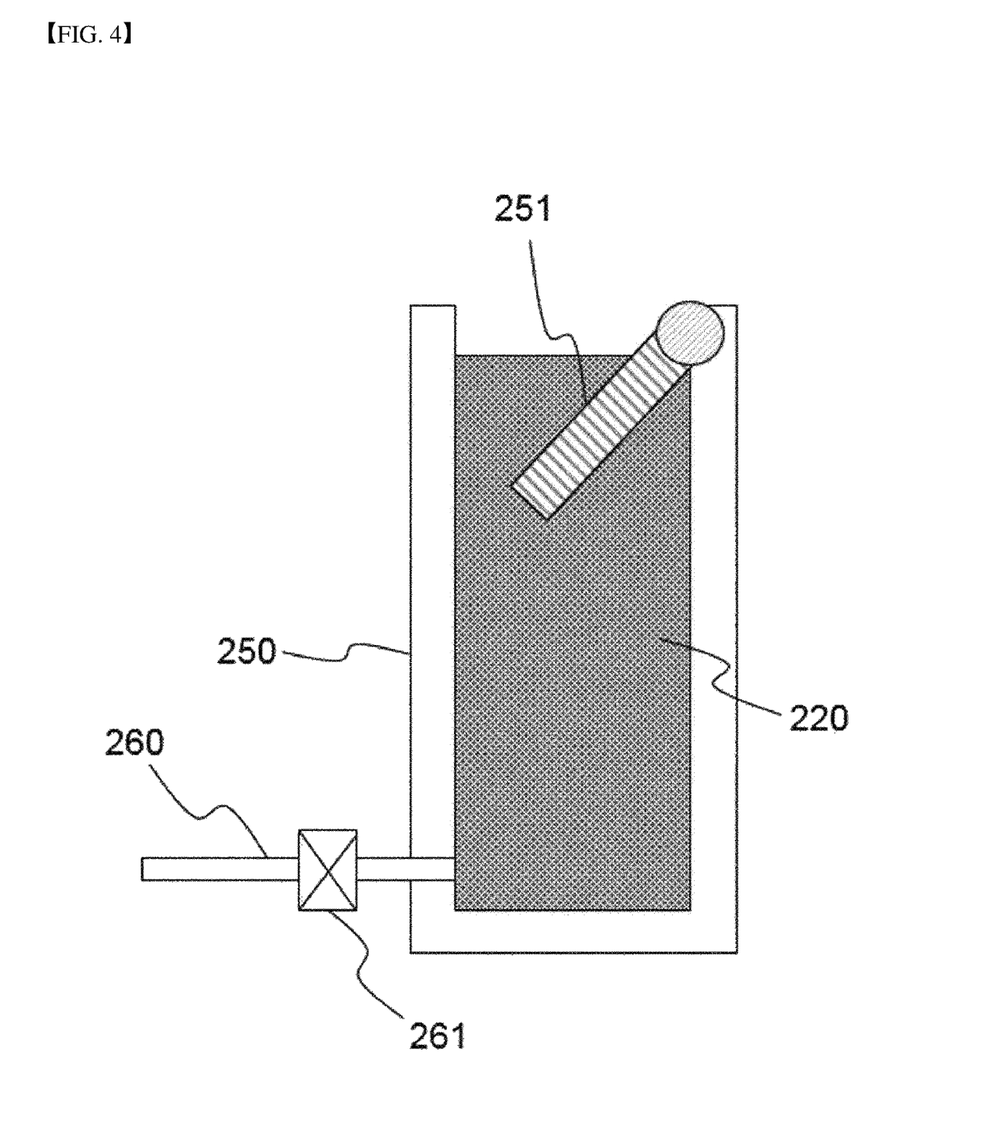

FIGS. 3 and 4 are schematic diagrams illustrating an opening and closing process of a pressure regulating member according to one embodiment of the present invention. Referring to FIG. 3, the pressure regulating member according to the present invention includes an electrode slurry storage tank 250 with an open upper surface, a static pressure opening and closing valve 251 which covers the upper surface of the electrode slurry storage tank 250, and an electrode slurry outlet flow path 260 formed at one lower side of the electrode slurry storage tank 250. The static pressure opening and closing valve 251 includes a plate-shaped shielding member supported by elastic force of an elastic body (e.g., a spring). Through this, the static pressure opening and closing valve 251 is opened when the pressure of the electrode slurry discharge flow path is greater than the internal pressure of the electrode slurry storage tank 250.

Referring to FIG. 4, the static pressure opening and closing valve 251 is opened when the pressure of the electrode slurry discharge flow path is greater than the internal pressure of the electrode slurry storage tank 250. The electrode slurry storage tank 250 maintains an internal pressure of 14 kgf, for example, in a state where the electrode slurry 220 is filled. When the pressure of the electrode slurry discharge flow path exceeds 14 kgf, the pressure of the electrode slurry discharge flow path is not transmitted to push and open the static pressure opening and closing valve 251. As the static pressure opening and closing valve 251 is opened, a part of the electrode slurry located in the electrode slurry discharge flow path is moved to the electrode slurry storage tank 250. Thus, the pressure of the electrode slurry discharge flow path is reduced.

Further, the electrode slurry outlet flow path 260 is formed at one lower side of the slurry storage tank 250. An outlet pump 261 is formed on the electrode slurry outlet flow path 260. As mentioned above, the internal pressure of the electrode slurry storage tank 250 increases due to an electrode slurry which flows in as the static pressure opening and closing valve is opened. If the internal pressure of the electrode slurry storage tank 250 increases, part of the internal electrode slurry is discharged to the electrode slurry outlet flow path 260 by the outlet pump 261. It is also possible to form a separate static pressure opening and closing valve instead of the outlet pump 261.

Third Embodiment

Figure 5:
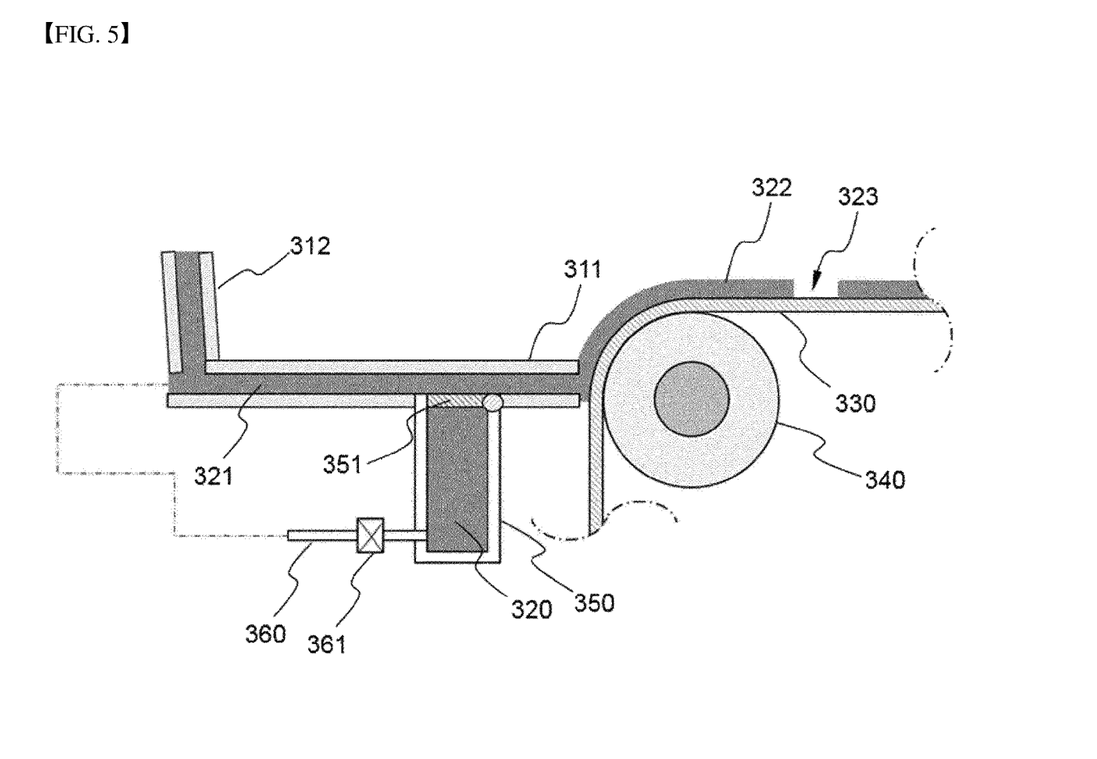
FIG. 5 is a schematic diagram illustrating an electrode slurry coating process according to an electrode slurry coating method according to one embodiment of the present invention.

FIG. 5 is a schematic diagram illustrating an electrode slurry coating process according to an electrode slurry coating method according to one embodiment of the present invention. Referring to FIG. 5, the method of coating an electrode slurry according to the present invention includes a step of discharging an electrode slurry 321 through a slit-shaped electrode slurry discharge flow path 311 formed on the interface between two dies. The electrode slurry 321 is supplied through the electrode slurry supply flow path 312. Further, in the step of discharging the electrode slurry 321, a process of starting the discharge of the electrode slurry 321 and a process of interrupting the discharge of the electrode slurry 321 are repeated. At this time, the pressure of the electrode slurry 321 discharged by the pressure regulating member formed on the slit-shaped discharge flow path 311 is maintained constant. The pressure regulating member includes an electrode slurry storage tank with an open upper surface, a static pressure opening and closing valve 351 which covers the upper surface of the electrode slurry storage tank 350, and an electrode slurry outlet flow path 360 formed at one lower side of the electrode slurry storage tank 350. The current collector layer 330 is located on a conveyor moving by a rotating roller 340. The electrode slurry is coated on the current collector layer 330 so that the coated part 322 and the non-coated part 323 are repeated at regular intervals.

Further, the electrode slurry 320 is filled in the electrode slurry storage tank 350 to thereby maintain a constant pressure. When the pressure of the electrode slurry discharge flow path 311 increases, the static pressure opening and closing valve 351 is opened, and part of the electrode slurry 321 existing in the electrode slurry discharge flow path 311 flows into the electrode slurry storage tank 350, thereby controlling pressure. When the pressure in the electrode slurry storage tank 350 exceeds a predetermined level, part of the electrode slurry 320 filled inside is discharged to the electrode slurry outlet flow path via the outlet pump 361.

In some cases, the electrode slurry discharged to the electrode slurry outlet flow path 360 is returned to the electrode slurry discharge flow path 311 or the electrode slurry supply flow path 312.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS 11, 111, 311: electrode slurry discharge flow path
12, 112, 312: electrode slurry supply flow path
21, 121, 220, 320, 321: Electrode Slurry
22, 22(a), 22(b), 122, 322: coated part
23, 123, 323: non-coated part
30, 130, 330: current collector layer
40, 140, 340: roller
150, 250, 350: electrode slurry storage tank
151, 251, 351: static pressure opening and closing valve
260, 360: electrode slurry outlet flow path
261, 361: outlet pump

The invention claimed is:

1. An apparatus for coating an electrode slurry, comprising:
an electrode slurry discharge flow path configured to discharge an electrode slurry through a slit formed on an interface between first and second dies;
an electrode slurry storage tank configured to be fluidly connectable to the electrode slurry discharge flow path and store the electrode slurry therein at a static pressure condition; and
a static pressure opening and closing valve configured to be located on a flow path on which the electrode slurry discharge flow path is fluidly connected to the electrode slurry storage tank,
wherein an opening or closing of the static pressure opening and closing valve is determined according to a difference between a pressure of the electrode slurry discharge flow path and an internal pressure of the electrode slurry storage tank, wherein the electrode slurry discharge flow path and the electrode slurry storage tank face each other, and are directly connected, in a state in which the static pressure opening and closing valve is interposed therebetween.

2. The apparatus of claim 1, wherein the static pressure opening and closing valve is configured to open when the pressure of the electrode slurry discharge flow path is greater than the internal pressure of the electrode slurry storage tank.

3. The apparatus of claim 1, wherein the static pressure opening and closing valve includes a shielding member supported by an elastic force of an elastic body, and wherein the shielding member is configured to open if a force of pressurizing the shielding member by the pressure of the electrode slurry discharge flow path exceeds a predetermined reference value.

4. The apparatus of claim 1, further comprising a pressure sensor configured to measure an internal pressure of the electrode slurry discharge flow path, wherein the static pressure opening and closing valve is configured to open if a pressure measured by the pressure sensor exceeds a predetermined reference value.

5. The apparatus of claim 1, wherein the electrode slurry storage tank further includes an electrode slurry outlet flow path configured to discharge the stored electrode slurry if the internal pressure of the electrode slurry storage tank exceeds a predetermined reference value.

6. The apparatus of claim 5, wherein the electrode slurry outlet flow path is fluidly connected to the electrode slurry discharge flow path.

7. The apparatus of claim 1, further comprising a discharge control pump configured to control a discharge amount of the electrode slurry through the electrode slurry discharge flow path.

8. The apparatus of claim 1, further comprising a discharge blocking member configured to control an opening and closing of the electrode slurry discharge flow path.

9. The apparatus of claim 8, wherein the discharge blocking member is formed at an end of the electrode discharge flow path.

* * * * *